United States Patent [19]
Fukui et al.

[11] Patent Number: 6,078,337
[45] Date of Patent: *Jun. 20, 2000

[54] MAINTAINING CONSISTENCY OF CACHE MEMORY DATA BY ARBITRATING USE OF A CONNECTION ROUTE BY PLURAL NODES

[75] Inventors: Toshiyuki Fukui, Kawasaki; Atsushi Date, Tokyo; Kazumasa Hamaguchi; Masato Kosugi, both of Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/526,328

[22] Filed: Sep. 11, 1995

[30] Foreign Application Priority Data

Sep. 12, 1994 [JP] Japan ...................................... 6-217154
Sep. 12, 1994 [JP] Japan ...................................... 6-217155

[51] Int. Cl.[7] ...................................................... G06F 13/16
[52] U.S. Cl. .......................... 345/521; 345/505; 345/513; 710/107; 711/119
[58] Field of Search ...................................... 395/287, 293, 395/306, 309, 311, 312, 445, 448, 447, 200.01, 200.02, 200.15, 200.21, 520, 502, 505, 511, 513, 526, 521, 200.06, 800, 800.01, 800.16, 800.28, 200.3, 200.31, 200.43; 370/94.3; 359/109, 114, 118–121, 124, 127, 125; 711/118, 119; 345/502, 505, 511, 513, 526, 521, 520; 710/100, 107, 113, 49, 123, 126

[56] References Cited

U.S. PATENT DOCUMENTS

| 4,797,879 | 1/1989 | Habbab et al. | 359/121 |
| 5,189,671 | 2/1993 | Cheng | 370/471 |
| 5,261,109 | 11/1993 | Cadambi et al. | 395/291 |
| 5,369,744 | 11/1994 | Fukushima et al. | 395/501 |
| 5,568,633 | 10/1996 | Boudou et al. | 395/448 |

OTHER PUBLICATIONS

"A distributed Memory Multi–thread Multiprocessor Architecture for Computer Vision and Image Processing: Optimized Vesion of AMP" by Taniguchi et al, IEEE, 1993 pp. 151–160.

Primary Examiner—Kee M. Tung
Attorney, Agent, or Firm—Fitzpatrick, Cella, Harper & Scinto

[57] ABSTRACT

In a system in which a plurality of nodes are connected using a light wavelength multiplexing connection route which can simultaneously connect nodes using light beams of a plurality of different wavelengths, each node has a cache memory for holding data in memories in other nodes. Some or all of the pieces of information required for data transfer in one node or between the nodes are transferred from the node to an arbiter used in use arbitration of the connection route via one of arbitration optical signal routes for respectively connecting the arbiter and the nodes. The arbiter distributes the transferred information to other nodes, and each node updates the contents of its cache memory on the basis of the distributed information.

18 Claims, 14 Drawing Sheets

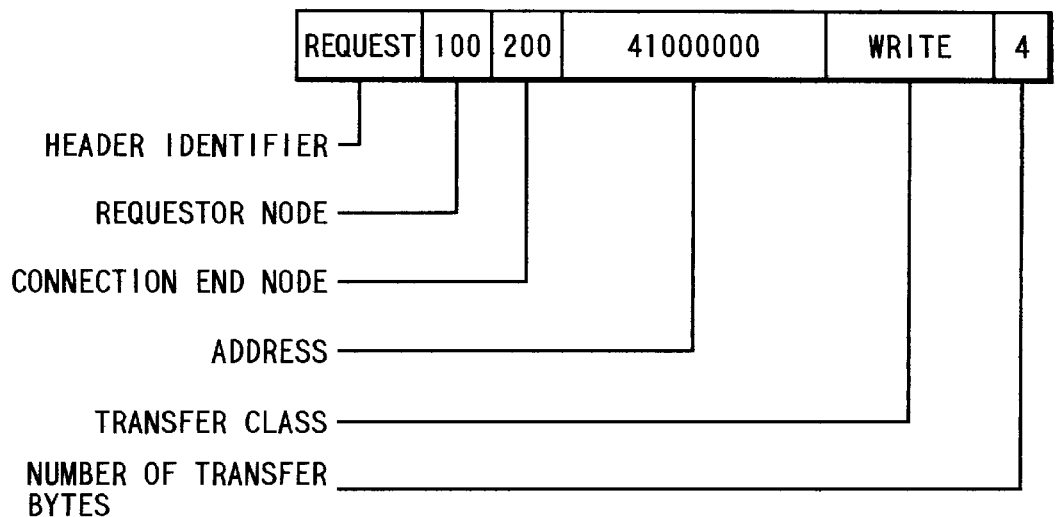
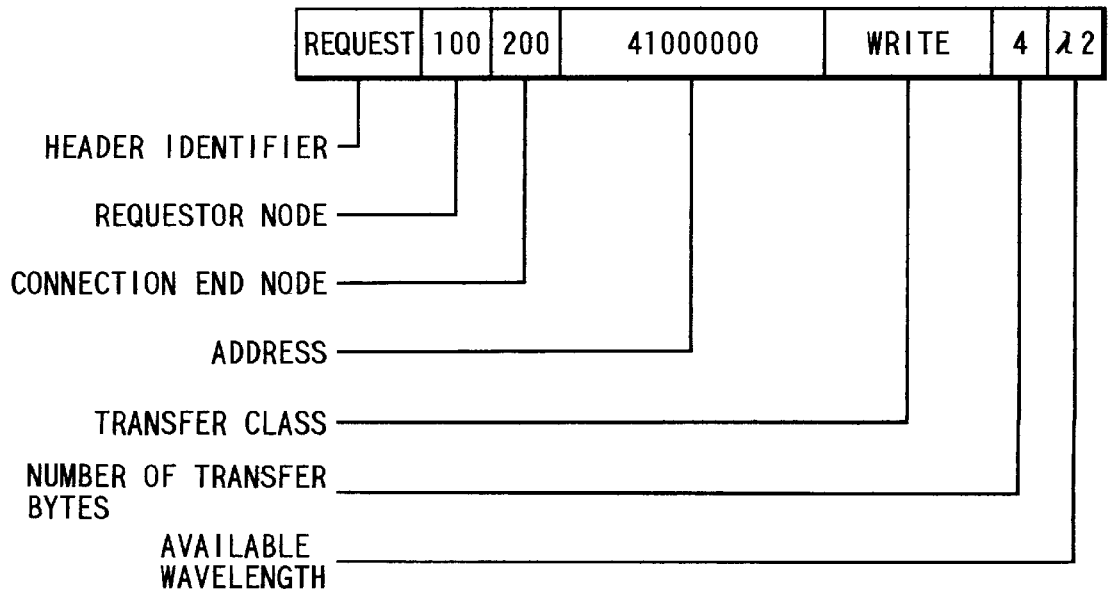

MAINTAINING CONSISTENCY OF CACHE MEMORY DATA BY ARBITRATING USE OF A CONNECTION ROUTE BY PLURAL NODES

BACKGROUND OF THE INVENTION

1. Field of the Invention

The present invention relates to a parallel computing system which is constituted by a group of information processing apparatuses each having at least one processor, a memory, and a cache memory as main components, and a connection route for connecting the group of information processing apparatuses.

2. Related Background Art

When a group of information processing apparatuses (to be referred to as nodes hereinafter) each having at least one processor and a memory are connected for the purpose of exchanging data among the nodes, a method of connecting them using various kinds of LANs, and a method of connecting them on the memory address level without using a LAN, are available. As an example of the latter method, the assignee of the present invention proposed an information processing apparatus using an optical wavelength multiplexing method in U.S. Pat. No. 5,602,663, now U.S. Pat. No. 5,602,663. According to this method, by using a plurality of identifiable wavelengths, different data transfer operations can be realized at the same time among a plurality of nodes.

Furthermore, that patent discloses an information apparatus in which each node sends additional information associated with data transfer to an arbiter together with a connection route request prior to the data transfer, and the arbiter sends the received information to a connection end node via an arbitration signal line. The node which received the connection request simultaneously realizes set-up control of the connection route and preparation control of data to be transmitted/received, thus improving the data transfer efficiency after the connection route is set.

When data are shared on the memory address level like in the above-mentioned system, each node normally comprises a cache memory to decrease the number of times of access to the data transfer path so as to improve the use efficiency of data in each node. In this case, since only one data transfer operation is allowed at a time on the data transfer path, the cache memories are snooped to maintain the consistency of data in them.

However, in the system using the optical wavelength multiplexing method, since different data transfer operations can be simultaneously realized among a plurality of nodes using a plurality of wavelengths, it is impossible to simultaneously snoop the plurality of data transfer operations from the nodes. For this reason, it is difficult to use, in each node, a cache memory for holding data in memories in other nodes.

For this reason, data requests for data on memories in other nodes constantly appear on an inter-node connection route, resulting in low computing efficiency.

SUMMARY OF THE INVENTION

It is, therefore, an objective of the present invention to provide a system which can simultaneously realize different data transfer operations among a plurality of nodes, and in which a cache memory for holding data in memories in other nodes is arranged in each node.

It is another objective of the present invention to execute processing for maintaining the consistency of data in the cache memory at high speed.

According to one aspect, the present invention which achieves these objectives relates to an information processing system comprising: a plurality of nodes; a connection route which can simultaneously connect a plurality of pairs of the plurality of nodes; arbitration means for arbitrating use requests of the connection route; and arbitration signal routes for respectively connecting the arbitration and the plurality of nodes; each of the plurality of nodes comprising at least one processor, a cache memory, monitor means for monitoring a signal on a bus in the node, updating means for updating an internal state of the cache memory on the basis of a monitoring result of the monitor means, and transfer means for transferring some or all pieces of information required for data transfer in the node or between the nodes from the node to the arbitration means using the arbitration signal route, the arbitration means comprising distribution means for distributing some or all the pieces of information to the plurality of nodes using the arbitration signal routes on the basis of information transferred from the node by the transfer means.

According to another aspect, the present invention which achieves these objectives relates to an information processing system comprising: a plurality of nodes; a connection route which can simultaneously connect a plurality of pairs of the plurality of nodes; data distribution means, arranged on the connection route, for distributing data to the plurality of nodes; arbitration means for arbitrating use requests of the connection route; and arbitration signal routes for respectively connecting the arbitration and the plurality of nodes; each of the plurality of nodes comprising at least one processor, a cache memory, monitor means for monitoring a signal on a bus in the node, updating means for updating an internal state of the cache memory on the basis of a monitoring result of the monitor means, and transfer means for transferring some or all pieces of information required for data transfer in the node or between the nodes from the node to the arbitration means using the arbitration signal route, wherein the arbitration means transmits some or all the pieces of information transferred from the node by the transfer means to the data distribution means, and the data distribution means distributes the information to the plurality of nodes using the connection route.

According to still another aspect, the present invention which achieves these objectives relates to a method of maintaining consistency of data in a cache memory in an information processing system which has a plurality of nodes each having at least one processor and a cache memory, comprising: the arbitration step of arbitrating use requests of a connection route, which can simultaneously connect a plurality of pairs of the plurality of nodes, using an arbiter; the transfer step of transferring some or all pieces of information required for data transfer in the node or between the nodes from the node to the arbiter using one of arbitration signal routes for respectively connecting the arbiter and the nodes; the distribution step of distributing some or all the pieces of information transferred from the node in the transfer step from the arbiter to the respective nodes using the arbitration signal routes; and the updating step of updating an internal state of the cache memory by detecting, the information distributed to the respective nodes in the distribution step, using a monitor unit for monitoring a signal on a bus in the node.

According to another aspect, the present invention which achieves these objectives relates to a method of maintaining consistency of data in a cache memory in an information processing system which has a plurality of nodes each having at least one processor and a cache memory, comprising: the arbitration step of arbitrating use requests of a connection route, which can simultaneously connect a plurality of pairs of the plurality of nodes, using an arbiter via a data distributor for distributing data to the respective nodes; the transfer step of transferring some or all pieces of information required for data transfer in the node or between the nodes from the node to the arbiter using one of arbitration signal routes for respectively connecting the arbiter and the nodes; the distribution step of distributing some or all the pieces of information transferred from the node in the transfer step from the arbiter to the respective nodes via the data distributor using the connection route; and the updating step of updating an internal state of the cache memory by detecting the information distributed to the respective nodes in the distribution step using a monitor unit for monitoring a signal on a bus in the node.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 shows the format of an arbitration request packet;

FIG. 6 shows the format of a connection preparation request packet;

DESCRIPTION OF THE PREFERRED EMBODIMENTS

The preferred embodiment of the present invention will be described in detail hereinafter with reference to the accompanying drawings.

[First Embodiment]

Figure 1:
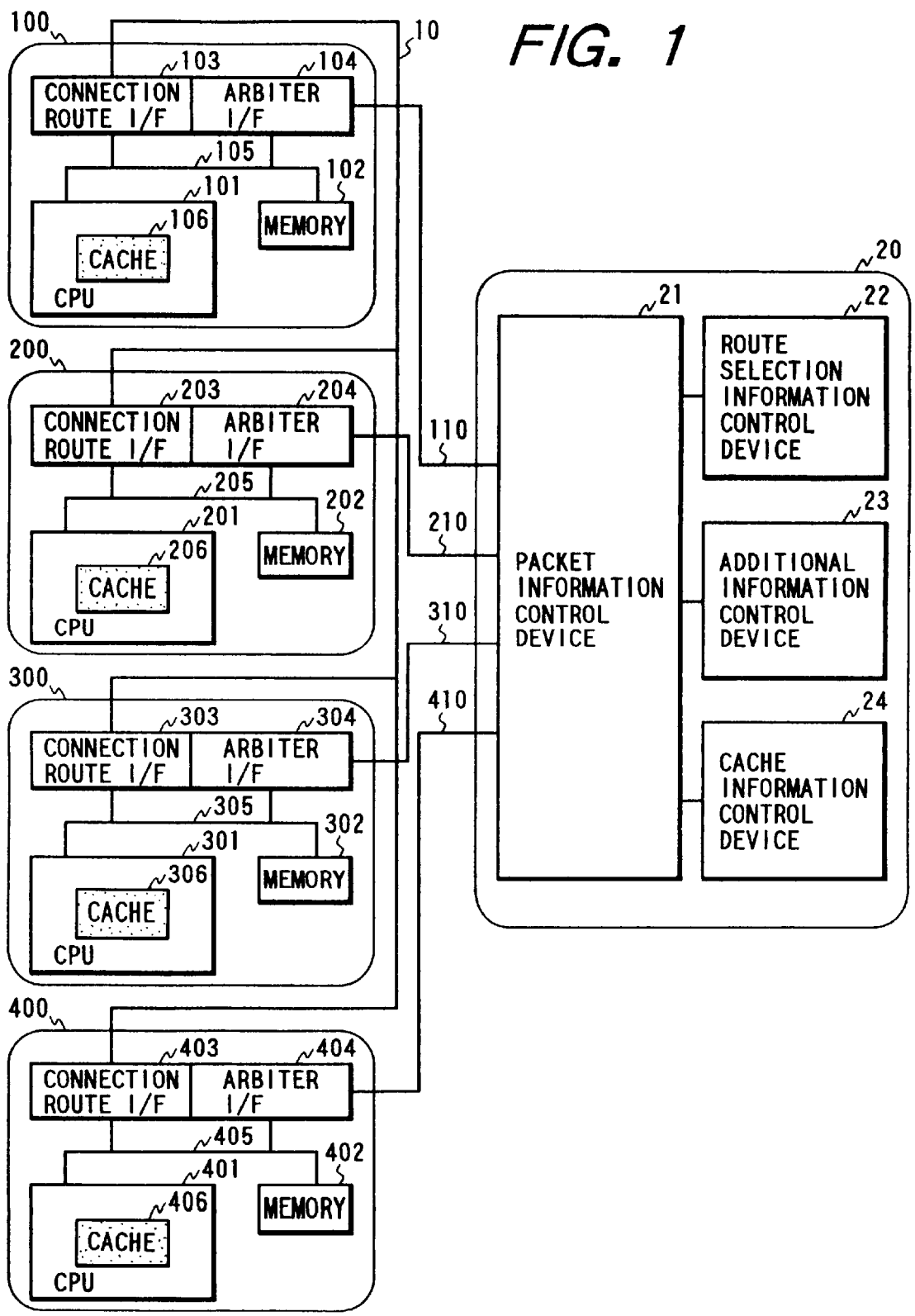
FIG. 1 is a block diagram showing the functional arrangement of an information processing system according to the first embodiment of the present invention.

FIG. 1 is a block diagram showing the information processing system of the first embodiment.

Nodes 100, 200, 300, and 400 are connected via a connection route 10 constituted by an optical fiber. The nodes 100, 200, 300, and 400 respectively include CPUs (Central Processing Units; to be simply referred to as processors hereinafter) 101, 201, 301, and 401, memories 102, 202, 302, and 402, connection route interface circuits 103, 203, 303, and 403 for connecting the connection route 10 and the internal circuits of the nodes, arbiter interface circuits 104, 204, 304, and 404 for generating use requests of the connection route 10, and internal buses 105, 205, 305, and 405 for connecting these circuits to each other in the respective nodes. In these nodes, cache memories 106, 206, 306, and 406 are built in the processors 101, 201, 301, and 401, respectively. However, the present invention is not limited to this arrangement. For example, the cache memory may be arranged outside the processor.

An arbiter 20 arbitrates use requests of the connection route 10, and is connected to the respective nodes via arbitration signal routes 110, 210, 310, and 410, respectively.

The arbiter 20 includes a packet information control device 21 for controlling packets sent from the respective nodes, a route selection information control device 22 for controlling route request information of the information included in a packet, an additional information control device 23 for temporarily storing additional information associated with data transfer such as address information sent after the above information, and a cache information control device 24 for temporarily storing information necessary for maintaining the consistency of the cache memories of those included in a packet, and performing control for re-distributing protocol information to the respective nodes.

In this embodiment, an example will be described below wherein the consistency of data in the cache memories is guaranteed using the invalidation protocol of write through type cache memories in the system with the arrangement shown in FIG. 1.

How to execute an operation for changing data when the node 100 is caching data on the node 200 and an operation for maintaining the consistency of data on the cache memories in association with the data changing operation will be exemplified below.

Figure 2:
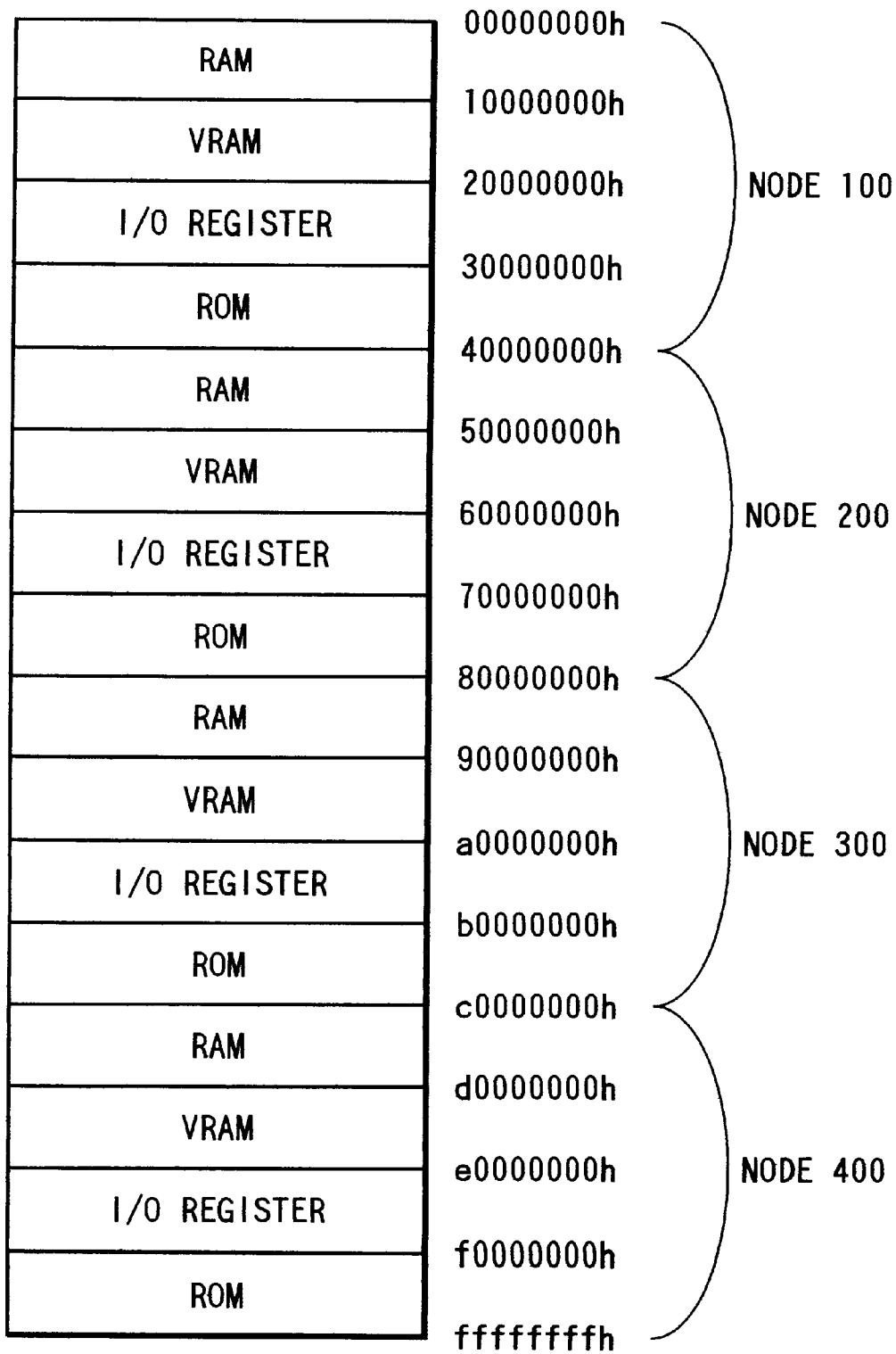
FIG. 2 shows the address map of the system.

FIG. 2 shows the address map of the entire system. In this embodiment, the address space of 4 Gbytes of the entire system is distributed to and used by the four nodes. Assume that the node 100 is caching data (4 bytes) at address 41000000h on a RAM of the node 200, and is about to change this data.

Note that a process for caching data at address 41000000h on the RAM in the node 200 to the cache memory 106 in the processor 101 in the node 100 is attained by performing a data read access between the two nodes, and storing the data in the cache memory, as described in Japanese Patent Application No. 5-288271 above. The process for storing the data in the cache memory is a known one as a cache memory system.

Figure 3:
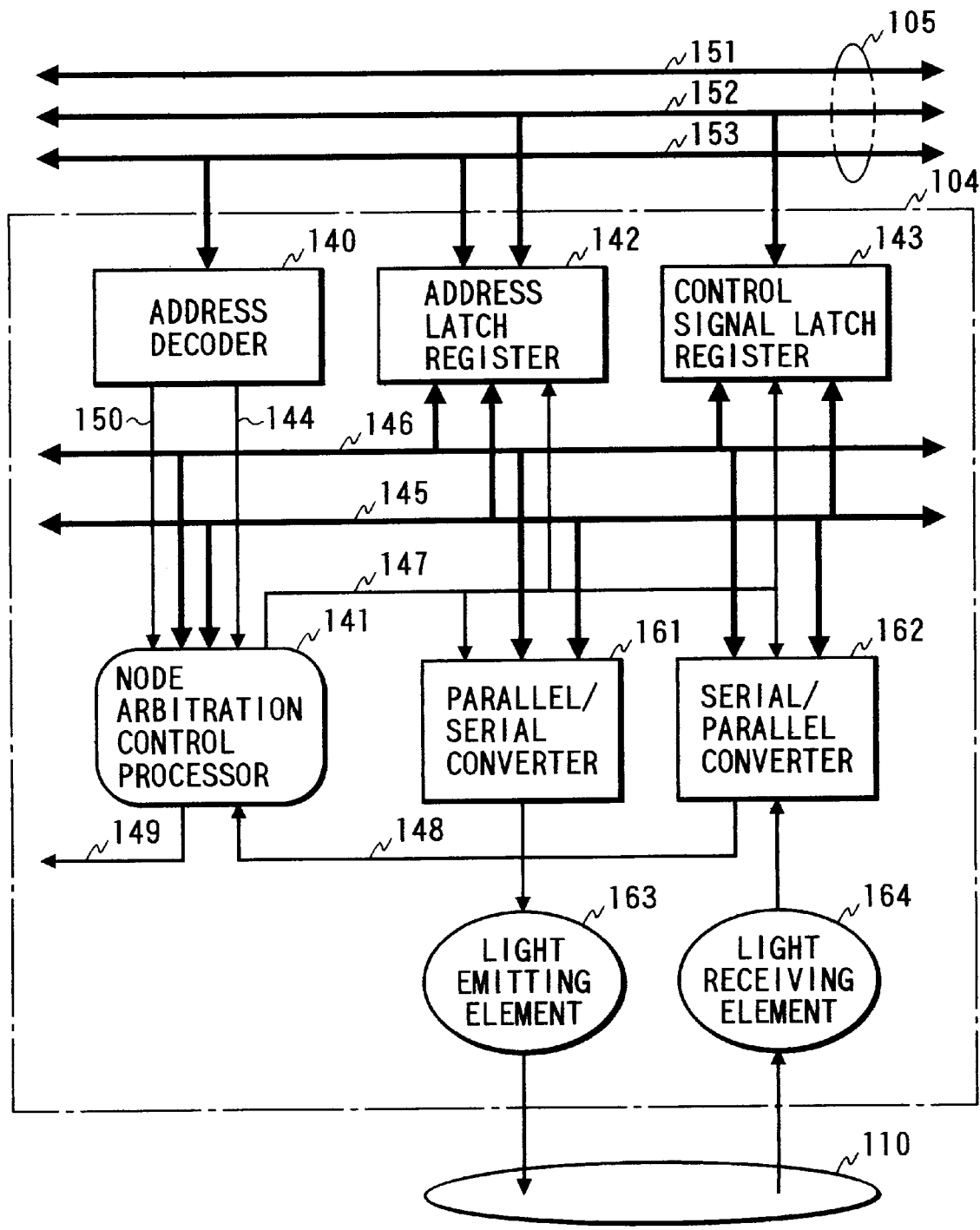
FIG. 3 is a diagram showing an arbiter interface of a node.

FIG. 3 is a block diagram of the arbiter interface circuit 104.

An address decoder 140 arranged in the arbiter interface circuit 104 always monitors the internal bus 105 (constituted by a data signal line 151, a control signal line 152, and an address signal line 153) of the node 100. When the address decoder 140 recognizes that an access (in this case, a write access to address 41000000h) to an external node (in this case, the node 200) upon a write through operation of cached data is generated on the bus, it transfers control to a program which runs on a node arbitration control processor 141 using an external access detection signal 144 and a write request detection signal 150.

At the same time, an address latch register 142 latches an address on the address line 153 at that time, and a control signal latch register 143 latches control information such as a read/write request class (write), the number of transfer bytes (4 bytes), data indicating a caching enable area, and the like. As the node arbitration control processor 141, a one-chip microcomputer is used in this embodiment. However, the present invention is not limited to this arrangement. For example, the node arbitration control processor 141 may be constituted by, e.g., a hardware logic circuit.

The node arbitration control processor 141 reads out the latched signals from the address latch register 142 and the control signal latch register 143, determines a connection end, generates an arbitration request packet with the format shown in FIG. 4 and writes the generated packet in a serial/parallel converter 161. As shown in FIG. 4, this packet serves as a route request signal, and includes additional information (address, transfer class, and the number of transfer bytes) associated with data transfer as its internal data format.

The parallel/serial converter 161 converts the written information into serial data, and outputs the converted data to a light emitting element 163. The light emitting element 163 photoelectrically converts the input signal into an optical signal of a wavelength $\lambda 1$, and outputs the converted signal to the arbiter 20 via the arbitration signal route 110 constituted by an optical fiber. This arrangement is common to all the nodes. Note that the light emitting element is an element such as an LED (Light Emitting Diode) or a laser, and a light receiving element is an element represented by a photodiode.

Figure 5:
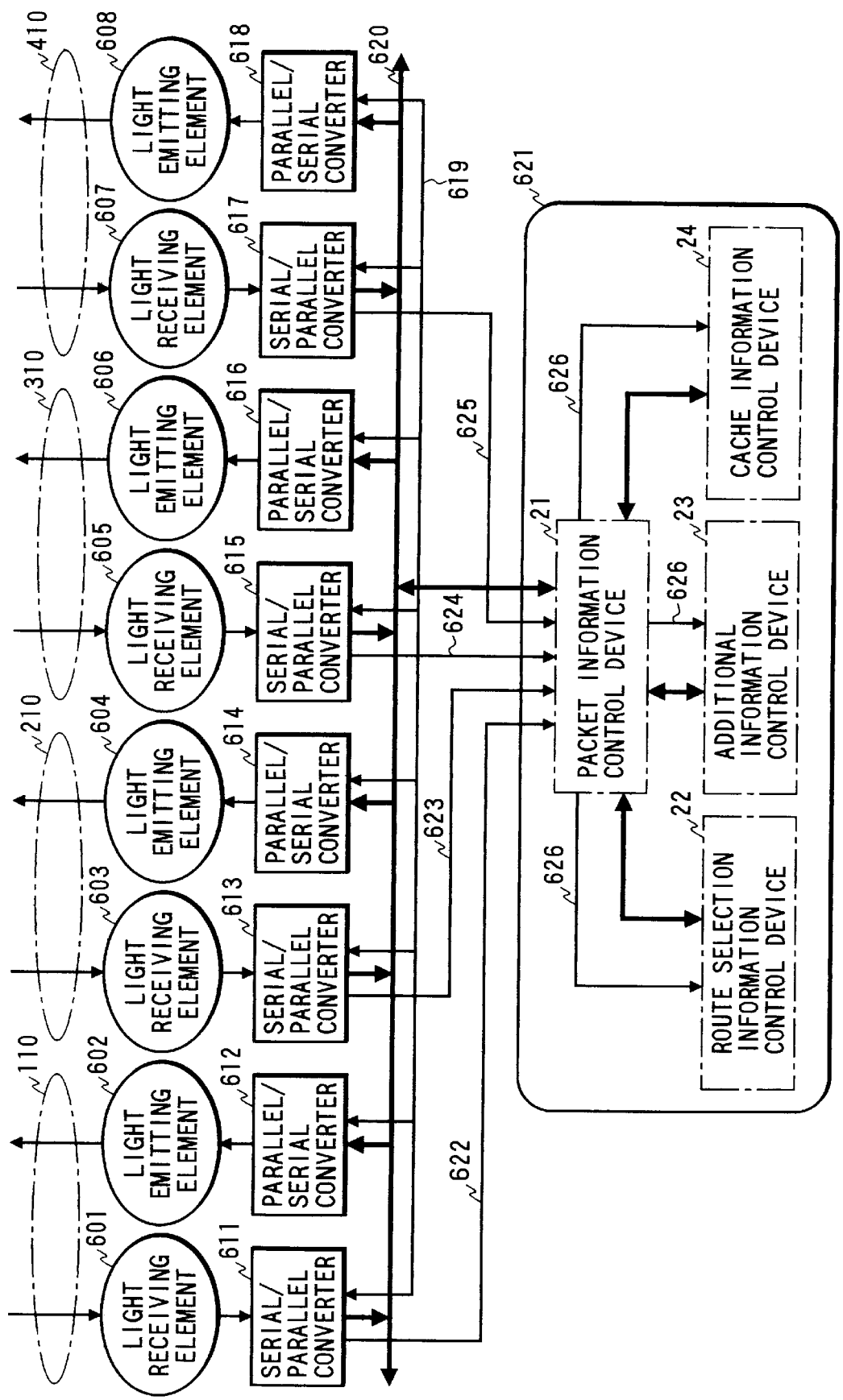
FIG. 5 is a diagram showing the arrangement of an arbiter.

FIG. 5 is a block diagram of the arbiter 20. Light receiving elements 601, 603, 605, and 607 respectively receive optical signals of the wavelength $\lambda 1$ emitted by the corresponding nodes, i.e., the arbitration request signals, and convert them into electrical signals. When the request signal from the node 100 arrives at the arbiter 20, it is converted by the light receiving element 601 into an electrical signal which is input to a serial/parallel converter 611. The serial/parallel converter 611 converts the input serial electrical signal into a parallel signal, and at the same time, sends a data reception detection signal 622 to the packet information control device 21.

In this embodiment, the packet information control device 21 is constituted by a micro-controller 621 which incorporates a ROM storing a program, and a RAM used as, e.g., a work area for processing. The micro-controller 621 also includes sections which play the roles of the route selection information control device 22, the additional information control device 23, and the cache information control device 24. However, the present invention is not limited to this arrangement.

Upon reception of the data reception detection signal (1) 622, the packet information control device selects the serial/parallel converter 611 using a device select signal 619, and reads out the request packet sent from the node 100 from the internal register of the converter 611 via a data bus 620.

Of the information included in the request packet, the requestor node number, the connection end node number, and the like are transferred to the route selection information control device 22, and the additional information associated with the data transfer is stored in the additional information control device 23 in the micro controller 621. Furthermore, when it is determined that this packet is generated upon execution of a write operation, the address and the number of transfer bytes, the requestor node number, the connection end node number, and the like in the request packet are stored in the cache memory control device 24 in the micro controller since a consistency maintenance operation of data in the cache memories in the respective nodes is required.

The route selection information control device 22 interprets the received data to recognize that the use request of a transmission path is a connection request from the node 100 to the node 200, and checks a, transmission path use state flag allocated in the route selection information control device 22 and wavelengths which are in use. When the device 22 detects an available wavelength, it sets the corresponding flag in an in-use state, and generates a connection preparation request packet shown in FIG. 6. The device 22 then writes the generated packet in parallel/serial converters 612 and 614.

This connection preparation packet includes the information supplied from the additional information control device in the micro controller 621, and the wavelength information. The two connection preparation request packets are output to the nodes 100 and 200 using optical signals of the wavelength $\lambda 1$ in the same manner as in the arbiter interface circuit 104. Note that the four nodes can concurrently perform two separate communications between two nodes using different wavelengths $\lambda 2$ and $\lambda 3$ for data communications.

Subsequently, the cache information control device 24 instructs the nodes 300 and 400 to invalidate the data at address 41000000h if they hold this data in their cache memories, on the basis of the input information, so as to maintain the consistency of data in the cache memories of these nodes. For this purpose, the device 24 generates a cache memory invalidation packet shown in FIG. 7, and sequentially writes the packet in parallel/serial converters 616 and 618.

In this case, if these converters and the like are currently used in arbitration of the connection route as the original function of the arbiter, the device 24 transfers the cache memory invalidation packets after the end of use.

These two cache memory invalidation packets are converted into optical signals of the wavelength $\lambda 1$ as in the arbiter interface circuit 104, and the optical signals are output to the nodes 300 and 400 via the arbitration signal routes 310 and 410.

A description of the data transfer state from the node 100 to the node 200 thereafter will be omitted, and the consistency maintenance operation of data on the cache memories in the nodes 300 and 400 will be described below taking the operation in the node 300 as an example.

Since the arrangement of the node 300 is the same as that of the node 100, FIG. 3 will be quoted in the following description.

In the node 300, the optical signal input to the arbiter interface circuit 304 (104 in FIG. 3) via the arbitration signal route 310 (110 in FIG. 3) constituted by an optical fiber is converted into an electrical signal by a light receiving element 164. The electrical signal is converted into a parallel signal by a serial/parallel converter 162, and at the same time, a data reception signal 148 is supplied to the node arbitration control processor 141.

Upon detection of this signal, the node arbitration control processor 141 in the node 300 reads out the cache memory invalidation packet from the serial/parallel converter 162 using a device select signal 147 and a data bus 145, and requests permission of use of the internal bus 305 inside the node. Upon reception of the permission of use of the internal bus 305, the node arbitration control processor 141 supplies a data transmission/reception request signal 149 to the connection route interface circuit 303 on the basis of the contents of the packet shown in FIG. 7, so as to instruct the cache memory which is caching the 4-byte data at address 41000000h to invalidate the corresponding block.

Figure 8:
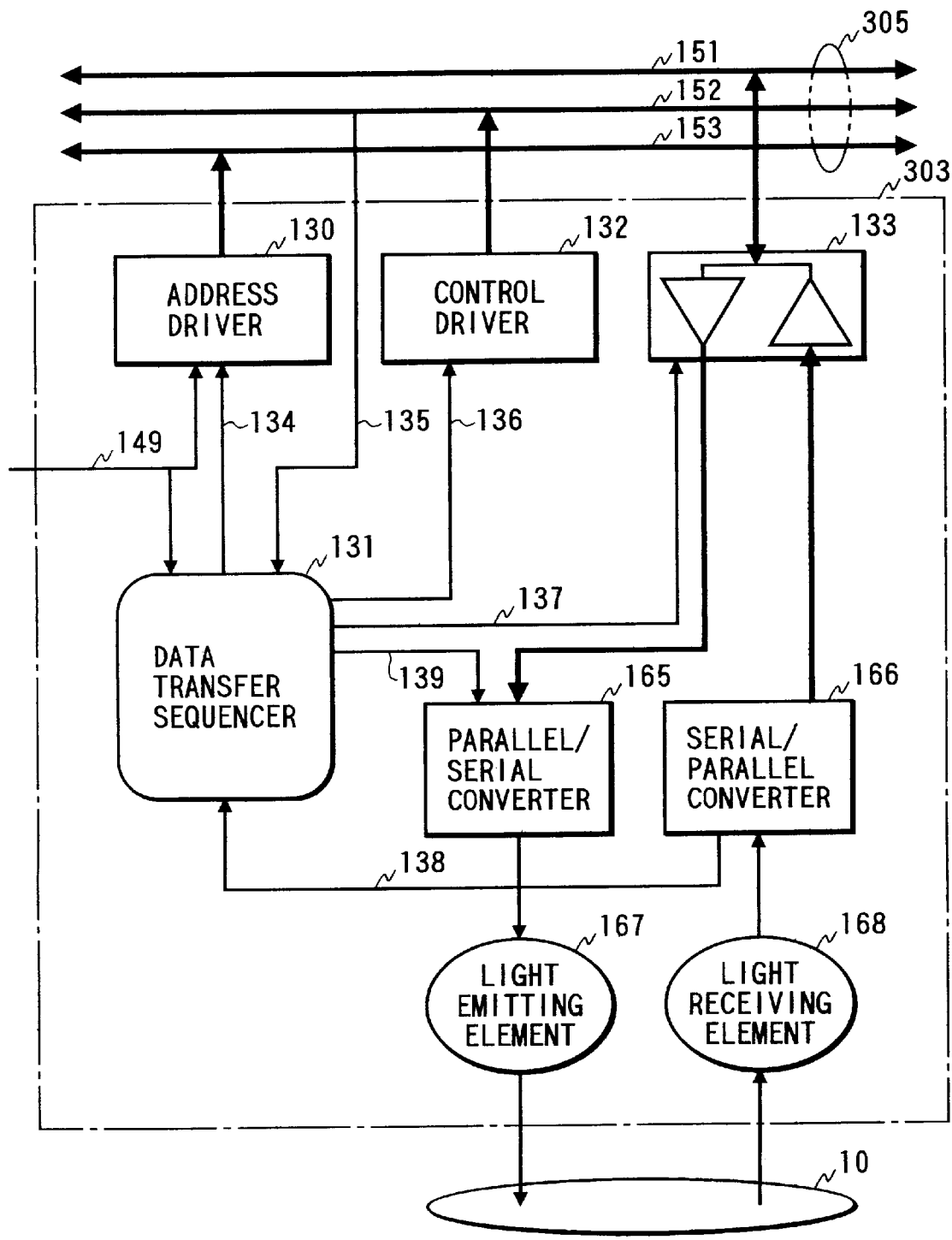
FIG. 8 is a diagram showing the diagram of a connection route interface unit.

FIG. 8 is a block diagram showing the arrangement of the connection route interface circuit 303. In this case, the data transmission/reception request signal 149 supplied from the arbiter interface circuit 304 instructs an address driver 130 to drive the address (41000000h), and request a data transfer sequencer 131 to invalidate a cache memory block. More specifically, a write access of dummy data at address 41000000h on the internal bus 305 is instructed.

The data transfer sequencer 131 instructs the address driver 130 to drive address 41000000h using an address drive signal 134, and subsequently instructs a control driver 132 to drive control signals such as the transfer size (4 bytes), and a read/write signal (write) onto the bus via a signal line 136. Furthermore, the sequencer 131 instructs a data buffer 133 to drive dummy data onto the bus via a signal line 137.

The processor 301 in the node, which snoops the write processing of the dummy data, inspects the address tag of its internal cache memory 306, and invalidates the corresponding block if the block exists.

On the other hand, since the corresponding address does not exist on the memory 302, the write processing is ignored. The data transfer sequencer 131 instructs the control driver 132 to drive an acknowledge signal after an elapse of a predetermined delay time, so as to prevent a time-out state of the bus.

The same operations are executed in the node 400. Thus, the cache consistency maintenance operation upon execution of the data write operation of the node 100 is realized. The same processing is performed in transfer between other nodes.

In this embodiment, optical signals on the arbitration signal routes 110, 210, 310, and 410 in FIG. 1 use light of the wavelength $\lambda 1$, and optical signals on the connection route 10 use the wavelengths $\lambda 2$ and $\lambda 3$ (which are different from each other). In this case, if $\lambda 1=\lambda 2$ or $\lambda 1=\lambda 3$, no problem is posed in terms of the arrangement.

How to execute the consistency maintenance operation of data in the cache memory upon changing of data in a cache enable area in the self node will be described below. More specifically, a case will be exemplified below wherein the node 100 is caching data (4 bytes) at address 01000000h on its own internal RAM which can be cached by other nodes, and is about to change the data.

Referring to FIG. 3, the external access detection signal 144 does not respond in this case, and the control is transferred to the program which runs on the node arbitration control processor 141 using only the write request detection signal 150. At the same time, the address latch register 142 latches the address on the address signal line 153 at that time, and the control signal latch register 143 latches control information such as the number of transfer bytes (4 bytes).

Figure 9:
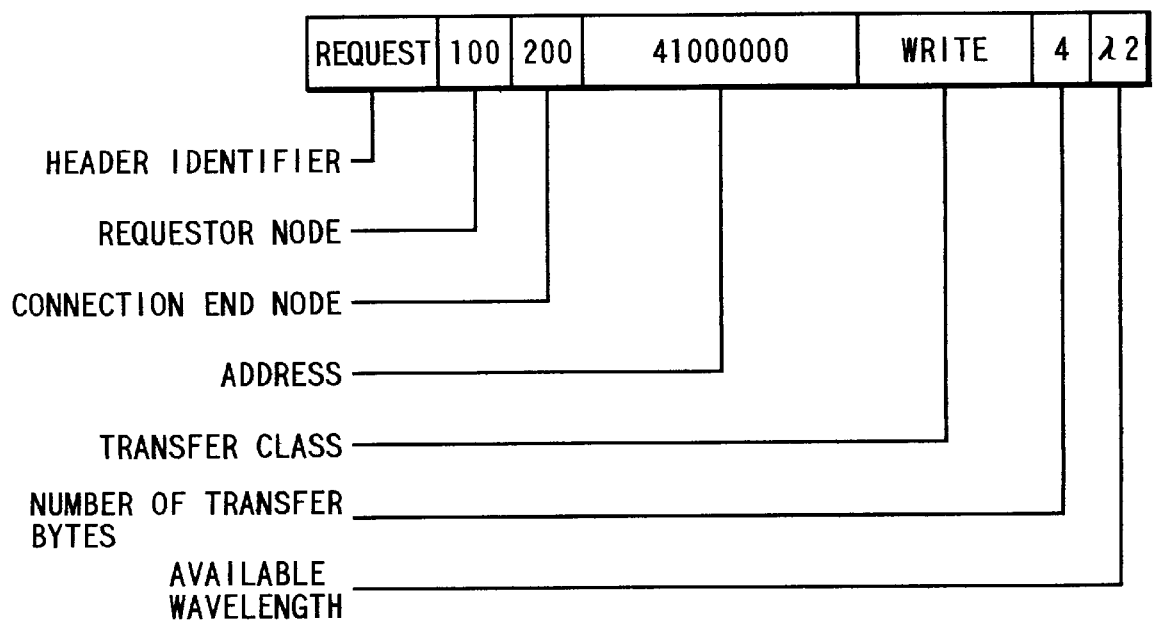
FIG. 9 shows the format of a cache maintenance request packet.

The node arbitration control processor 141 reads out the signals latched by the address latch register 142 and the control signal latch register 143, generates a cache maintenance request packet shown in FIG. 9, and writes the packet in the parallel/serial converter 161. The parallel/serial converter 161 converts the written information into serial data, and outputs the data to the light emitting element 163. The light emitting element 163 photoelectrically converts the input signal, and outputs an optical signal of the wavelength $\lambda 1$ to the arbiter 20 via the arbitration signal route 110 constituted by an optical fiber.

Referring to FIG. 5, when the cache maintenance request packet from the node 100 arrives, and is input to the serial/parallel converter 611, the serial/parallel converter 611 converts the input serial electrical signal into a parallel signal, and at the same time, supplies the data reception detection signal 622 to the packet information control device 21.

Upon reception of the data reception detection signal (1) 622, the packet information control device 21 selects the serial/parallel converter 611 using the device select signal 619, and reads out the cache maintenance request packet sent from the node 100 from the register in the converter 611 via the data bus 620. Then, the device 21 stores information such as the address and the number of transfer bytes, the transferor node number, and the like in the section of the micro controller, which serves as the cache information control device 24.

Figure 7:
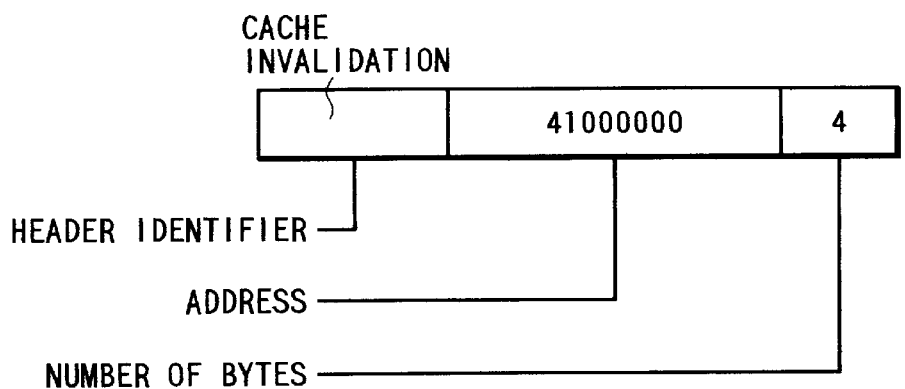
FIG. 7 shows the format of a cache memory invalidation packet.

In order to maintain the consistency of data in the cache memories, the cache information control device 24 generates a cache memory invalidation packet shown in FIG. 7 based on the input information, and sequentially writes the packet in the parallel/serial converters 614, 616, and 618, so as to instruct the nodes 200, 300, and 400 to invalidate data at address 01000000h if they hold the data in their cache memories.

Since the subsequent operations are the same as those in the above-mentioned example, a description thereof will be omitted.

In the embodiment described above, the arbitration signal routes 110, 210, 310, and 410, and the connection route 10 shown in FIG. 1 are assumed to be physically different signal routes. However, if these lines are logically separable, physically identical signal routes may be used.

In this case, in order to prevent crosstalk upon wavelength multiplexing, the wavelengths $\lambda 1$, $\lambda 2$, and $\lambda 3$ must be different from each other.

[Second Embodiment]

In the first embodiment described above, the invalidation processing for maintaining the consistency of data on the cache memories in the respective nodes is realized by performing write processing of dummy data in the respective nodes. On the other hand, when a write through type cache memory, which prepares for a special transaction for cache invalidation processing, is used, the invalidation processing for maintaining the consistency of data on the cache memories can be realized by executing a cache invalidate transaction in place of the write processing. Such an example will be described below with reference to FIGS. 10 and 11.

Figure 10:
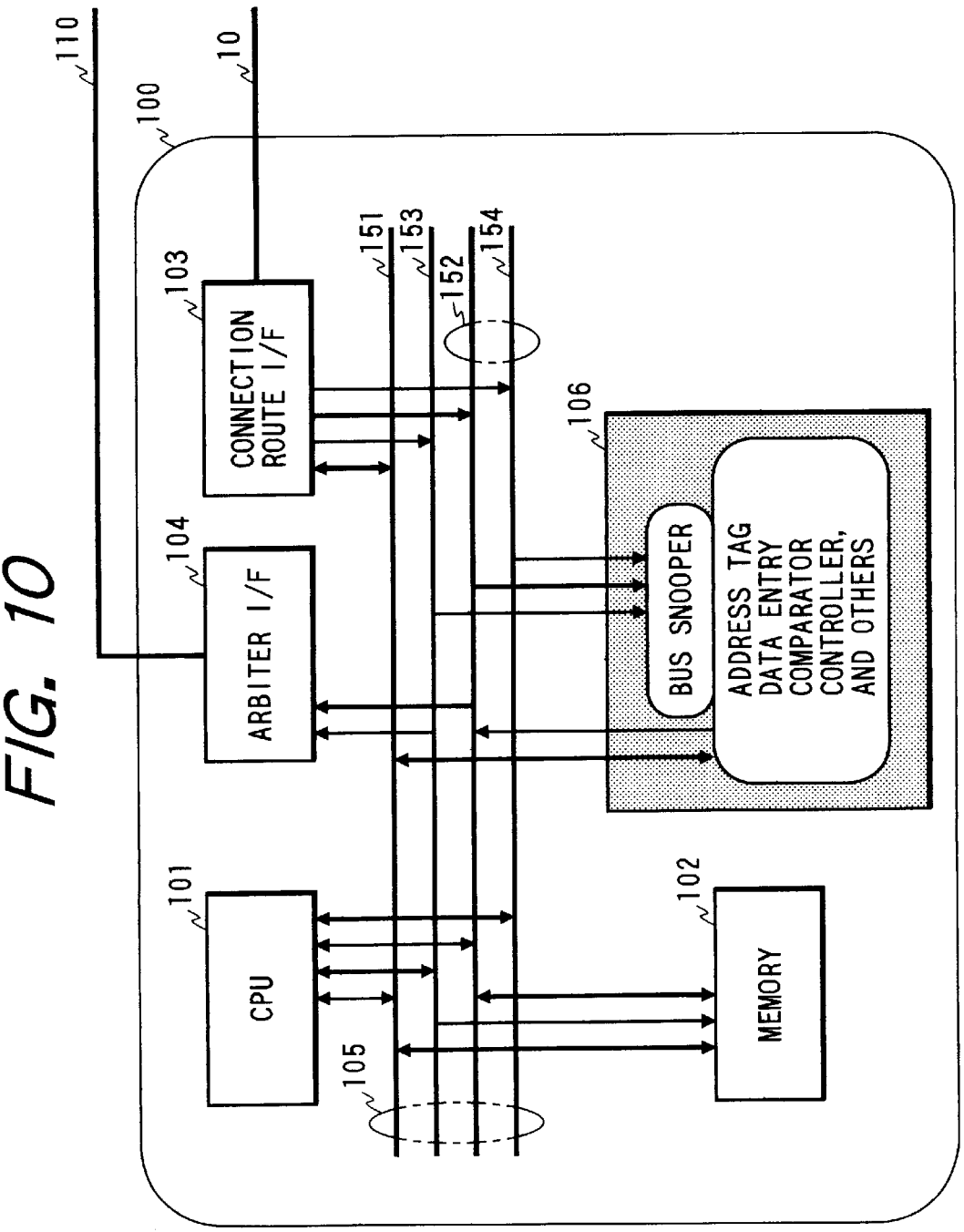
FIG. 10 is a diagram showing the arrangement of a node according to the second embodiment of the present invention.

FIG. 10 is a block diagram of the node of this embodiment. The node 100 will be taken as an example, and the reference numerals in FIG. 10 will quote those in the above embodiment. In this embodiment, the cache memory 106 is realized as an external cache memory arranged outside the CPU.

The cache memory 106 is constituted by a cache memory main body for storing cache address tags and data, a comparator, a bus snooper, a cache controller for controlling them, and the like. Since these constituting elements and the constituting method are known to those who are skilled in the art, a detailed description thereof will be omitted.

As the characteristic feature of FIG. 10, the cache bus snoop function includes a mechanism for detecting a cache invalidate transaction. In FIG. 10, the control signal line 152 in the internal bus includes a cache control signal line 154, which is snooped by the bus snooper. The bus snooper has a function of fetching the address on the address bus at the time of detection of a signal pattern representing an invalidate transaction on the signal line 154, inspecting its address tag, and invalidating the corresponding block if the block exists. The constituting method of the cache control signal line 154 is not limited to that of this embodiment. For example, some signal lines which can be defined by a user of the control signal line may be used and assigned as a plurality of signal lines.

Figure 11:
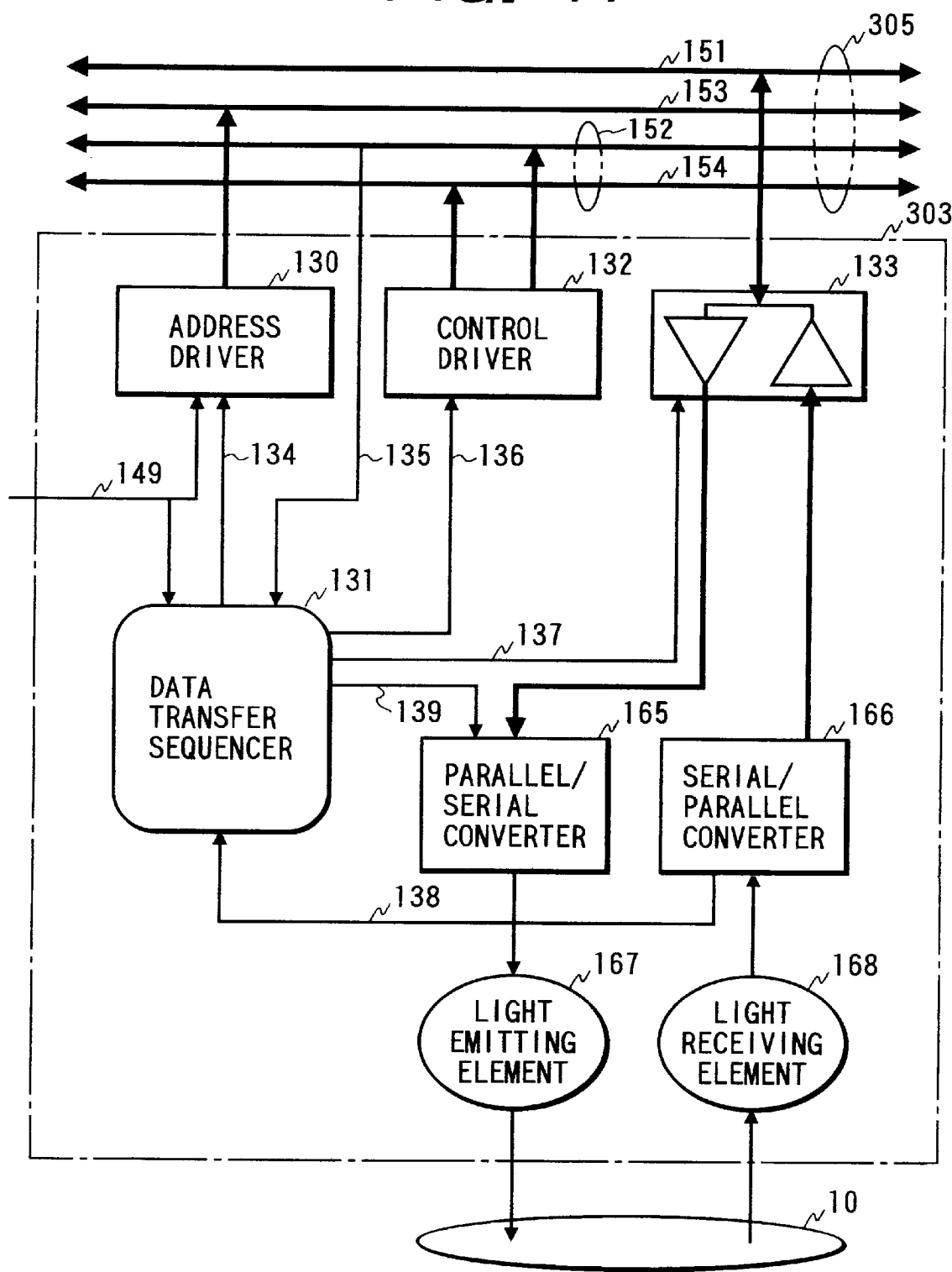
FIG. 11 is a diagram showing the arrangement of a connection route interface unit of the second embodiment.

FIG. 11 is a block diagram showing the arrangement of the connection route interface circuit 303 of this embodiment. The cache consistency maintenance operation executed when the above-mentioned cache memory is used will be described below with reference to FIG. 11. The operation until the invalidation instruction of data at address 41000000h is supplied from the arbiter interface circuit is the same as that in the above embodiment. More specifically, the data transmission/reception request signals 149 supplied from the arbiter interface circuit instruct the address driver 130 to drive the address (41000000h), and request the data transfer sequencer 131 to invalidate the corresponding cache memory block. However, in this embodiment, execution of a cache invalidate transaction with respect to address 41000000h onto the internal bus 305 is instructed in place of the write operation of the dummy data.

More specifically, in FIG. 11, the data transfer sequencer 131 instructs the address driver 130 to drive address 41000000h, and subsequently instructs the control driver 132 to drive a size (4 bytes) onto the control signal line 152 and a cache invalidation signal onto the cache control signal line 154 via the signal line 136.

The snooper, which detects a signal pattern representing the invalidate transaction on the signal line 154, fetches address 41000000h on the address bus, inspects its address tag, and invalidates the corresponding block if the block exists.

This transaction is one in which only an address appears on the bus, and the cache controller sends back an acknowledgement for this transaction on its own. For this reason, unlike in the above embodiment, the data transfer sequencer 131 need not instruct the control driver 132 to drive an acknowledge signal after an elapse of a predetermined delay time so as to prevent a time-out state of the bus. Therefore, the control of the data transfer sequence can be simplified.

Note that the method of sending back the acknowledgement is not limited to that in this embodiment. For example, the invalidation transaction may be defined as an address only transaction which need not send back any acknowledgement.

As described above, according to the present invention, some or all the pieces of information required for data transfer in one node or between the nodes are sent from the node to the arbiter using the arbitration signal route, and some or all the pieces of information are re-distributed to the respective nodes using the arbitration signal routes on the basis of the information sent from the node. Thus, a high-performance information processing system which can improve the computing efficiency and the use efficiency of the connection route in nodes since it can realize caching of information between nodes while reflecting information sent from the arbiter to the respective nodes in the respective nodes can be realized.

[Third Embodiment]

However, in the above-mentioned system of distributing data for maintaining the consistency of data in the cache memories by using the arbiter and the arbitration signal routes, since the arbiter sends packets to the respective nodes in turn, if the number of nodes increases, a processing lag may be generated, and the performance may deteriorate.

Furthermore, when the arbitration signal route is used for transferring an original optical connection route use request, it cannot be used for cache maintenance, and the performance may deteriorate due to a resulting processing lag.

In this embodiment, a concentrator is arranged independently of the arbiter, and simultaneously distributes information for cache maintenance to the respective nodes using the connection route for data transfer in place of the arbitration signal routes, thereby realizing high-speed caching of information between nodes.

Figure 12:
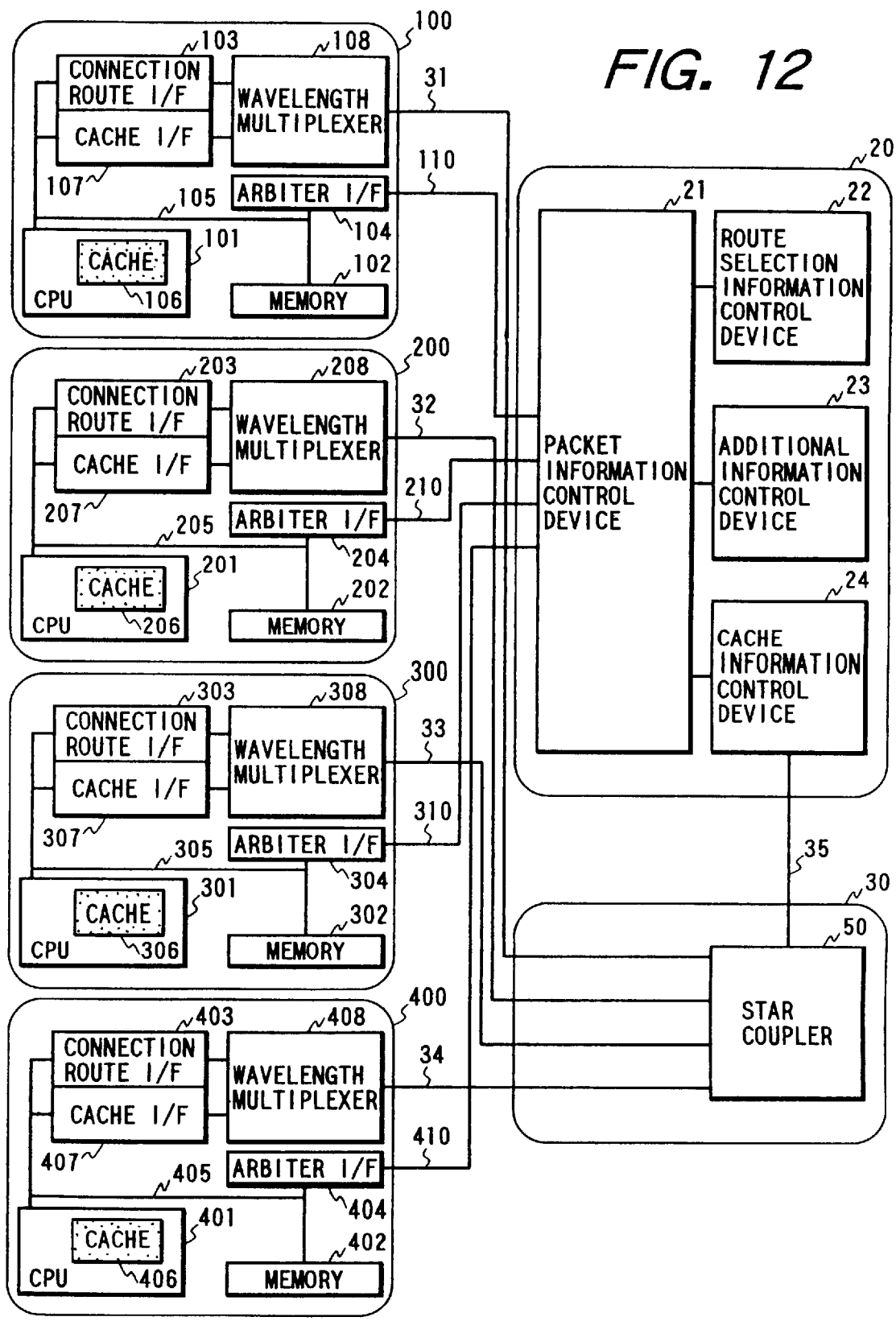
FIG. 12 is a block diagram showing the functional arrangement of an information processing system according to the third embodiment of the present invention.

FIG. 12 is a block diagram showing the system arrangement of this embodiment.

Nodes 100, 200, 300, and 400 are connected to a concentrator 30 via connection routes constituted by optical fiber pairs 31, 32, 33, and 34. The concentrator 30 incorporates a star coupler 50 for re-distributing signals input from the connection routes constituted by the optical fibers 31, 32, 33, and 34.

The nodes 100, 200, 300, and 400 respectively include CPUs (processors) 101, 201, 301, and 401, memories 102, 202, 302, and 402, connection route interface circuits 103, 203, 303, and 403 for connecting the connection routes constituted by the optical fibers 31, 32, 33, and 34 to the internal circuits of the respective nodes, arbiter interface circuits 104, 204, 304, and 404 for generating use requests of the connection routes constituted by the optical fibers 31, 32, 33, and 34, internal buses 105, 205, 305, and 405 for interconnecting these circuits in the respective nodes, cache maintenance interface circuits 107, 207, 307, and 407, and wavelength multiplexers 108, 208, 308, and 408. Note that cache memories 106, 206, 306, and 406 in the respective nodes are built in the processors 101, 201, 301, and 401. However, the present invention is not limited to this arrangement.

An arbiter 20 arbitrates the use of the connection routes constituted by the optical fibers 31, 32, 33, and 34, and is connected to the respective nodes via arbitration signal routes 110, 210, 310, and 410.

In the arbiter 20, in addition to a packet information control device 21 for controlling packets sent from the nodes, a route selection information control device 22 for controlling route request information of the information included in a packet, an additional information control device 23 for temporarily storing additional information associated with data transfer such as address information sent after the above information, and a cache information control device 24 for temporarily storing information necessary for maintaining the consistency of the cache memories of the information included in a packet, and performing control for re-distributing protocol information to the respective nodes are arranged. The cache information control device 24 is connected to the star coupler 50 in the concentrator 30 via a cache maintenance optical signal route 35.

In this embodiment, an example will be described below wherein the consistency of data in the cache memories is guaranteed using the invalidation protocol of write through type cache memories in the system with the arrangement shown in FIG. 12.

How to execute an operation for changing data when the node 100 caches data on the node 200 and an operation for maintaining the consistency of data on the cache memories in association with the data changing operation will be exemplified below.

As in the above embodiment, the address map of the entire system has the configuration shown in FIG. 2, and the arbiter interface circuit 104 has the arrangement shown in FIG. 3.

Figure 13:
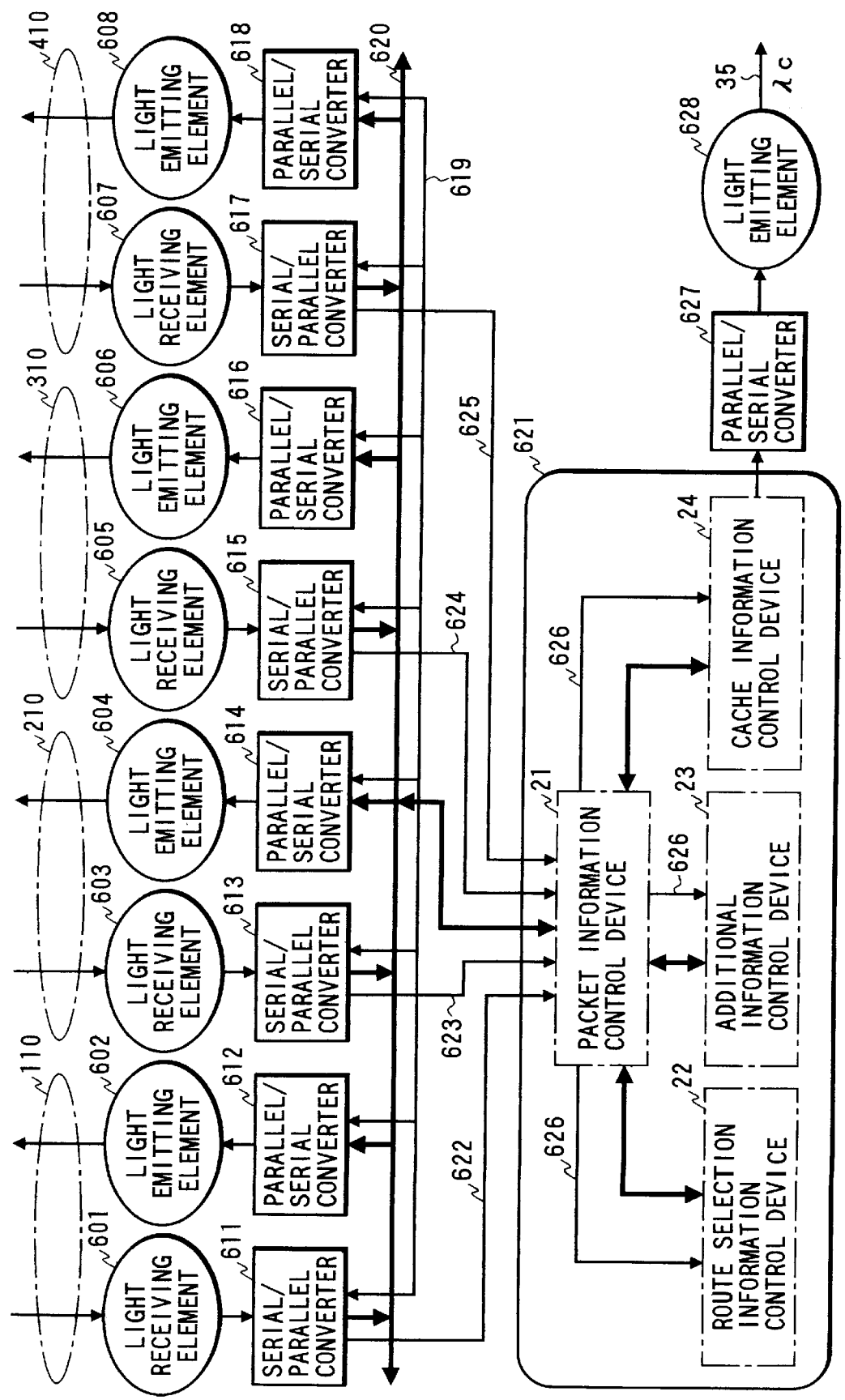
FIG. 13 is a diagram showing the arrangement of an arbiter of the third embodiment.

FIG. 13 is a block diagram of the arbiter 20 of this embodiment. A difference between FIGS. 13 and 5 is that the arbiter 20 of this embodiment comprises a parallel/serial converter 627 and a light emitting element 628.

In this embodiment, the cache information control device 24 instructs the nodes to invalidate data at address 41000000h if they hold this data in their cache memories, on the basis of the input information, so as to maintain the consistency of data in the cache memories of the nodes. For this purpose, the device 24 generates a cache memory invalidation packet shown in FIG. 14, and writes the packet in the parallel/serial converter 627.

The written packet is sent onto the cache maintenance optical signal route 35 using a wavelength $\lambda c$ via the light emitting element 628, and is input to the star coupler 50 in the concentrator 30. In this case, the wavelength $\lambda c$ is set to be different from the wavelengths $\lambda 2$ and $\lambda 3$ used for data transfer so as to prevent crosstalk. The cache memory invalidation packet input to the star coupler 50 is equally split to the respective nodes, and is output to the nodes via the optical fibers 31, 32, 33, and 34.

A description of the data transfer state from the node 100 to the node 200 thereafter will be omitted, and the consistency maintenance operation of data on the cache memories in the nodes 300 and 400 will be described below taking the operation in the node 300 as an example.

Figure 15:
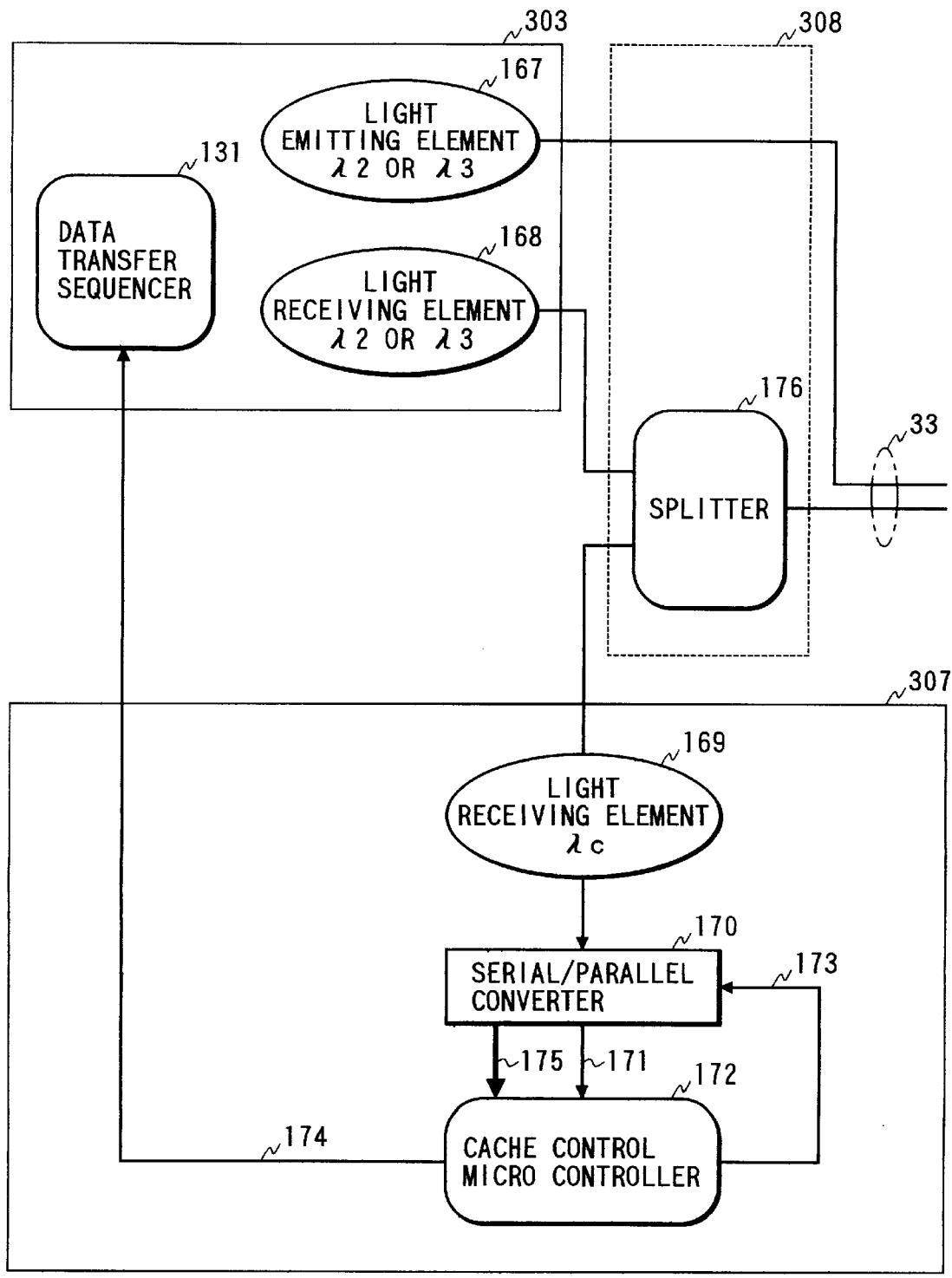
FIG. 15 is a diagram showing the arrangement of a cache maintenance interface unit of the third embodiment.

FIG. 15 is a block diagram showing the arrangements of the cache maintenance interface circuit 307 and the wavelength multiplexer 308.

The optical signal input to the node 300 via the optical fiber 33 is split by a splitter 176 into light (the wavelength $\lambda 2$ or $\lambda 3$) which propagates toward the connection route interface circuit 303 and light (the wavelength $\lambda c$) which propagates toward the cache maintenance interface circuit 307. The light of the wavelength $\lambda c$ input to the cache maintenance interface circuit 307 is converted into an electrical signal by a light receiving element 169, and the electrical signal is converted into a parallel signal by a serial/parallel converter 170. At the same time, a cache maintenance packet reception signal 171 is supplied to a cache control micro controller 172.

Figure 14:
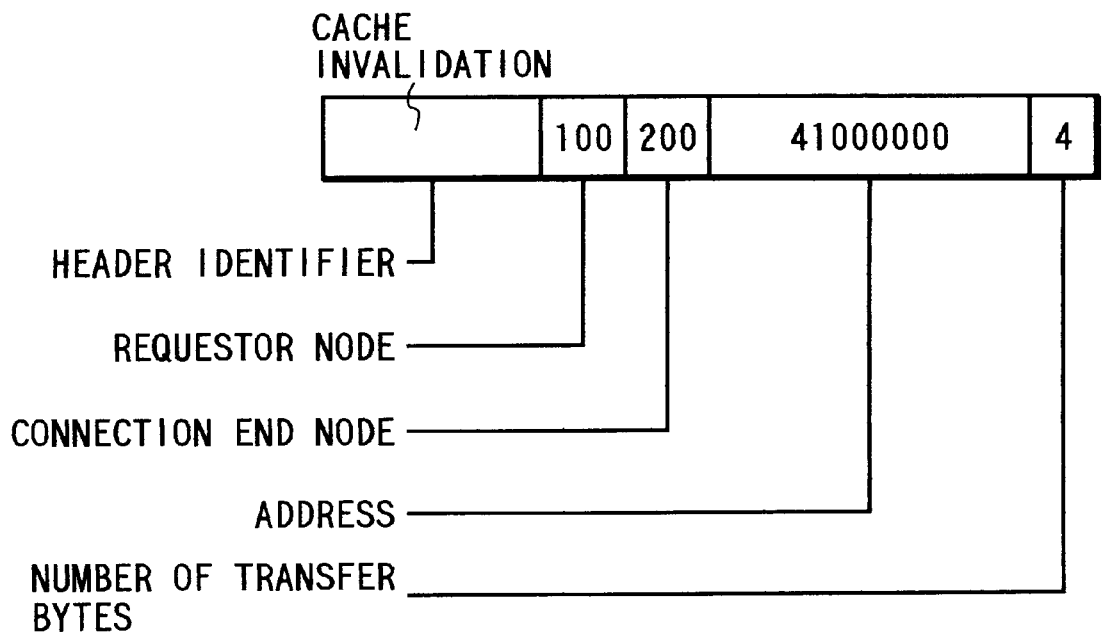
FIG. 14 shows the format of a cache memory invalidation packet of the third embodiment.

Upon detection of this signal, the cache control micro controller 172 in the node 300 reads out the cache memory invalidation packet shown in FIG. 14 from the serial/parallel converter 170 using a device select signal 173 and a data bus 175, and requests permission of use of the internal bus 305 inside the node. Upon reception of the permission of use of the internal bus 305, the cache control micro controller 172 supplies a cache maintenance request signal 174 to the connection route interface circuit 303 so as to instruct the cache memory which is caching 4-byte data at address 41000000h to invalidate the corresponding block, on the basis of the contents of the packet shown in FIG. 14.

Figure 16:
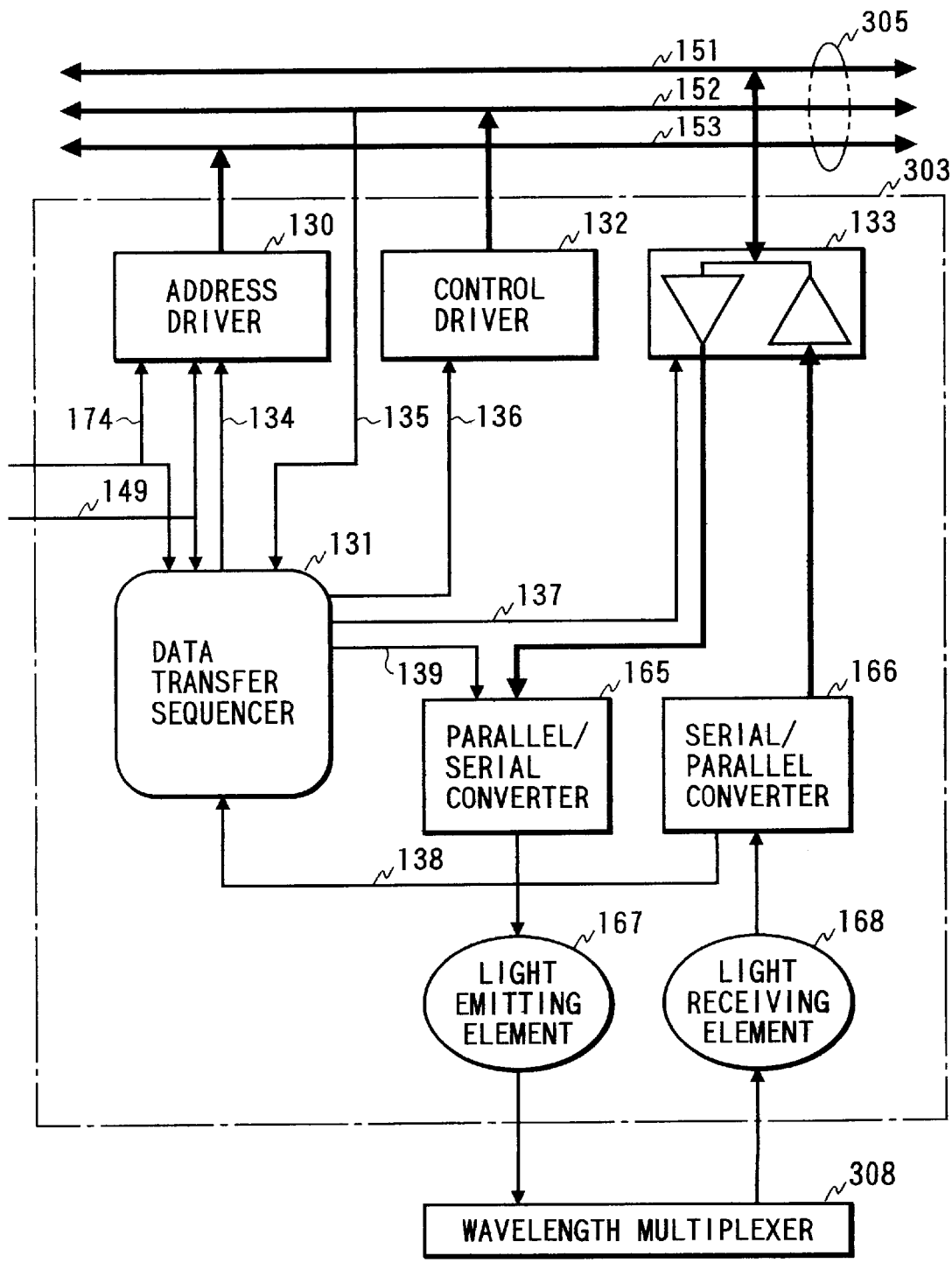
FIG. 16 is a diagram showing the arrangement of a connection route interface unit of the third embodiment.

FIG. 16 shows the arrangement of the connection route interface circuit 303. In this case, the data cache maintenance request signal 174 supplied from the cache control micro controller 172 instructs an address driver 130 to drive the address (41000000h), and a data transfer sequencer 131 to invalidate a cache memory block. More specifically, a write access of dummy data at address 41000000h on the internal bus 305 is instructed. The subsequent operation is performed as in the first embodiment.

In this embodiment, the cache invalidation request packet is sent to all the nodes. However, the node 100 as a source node and the node 200 as a destination node of the transferred data interpret the contents of the cache invalidation request packet shown in FIG. 14, and ignore the subsequent invalidation processing to be executed based on the packet when they find that the self node number is set in the requestor or connection end field in the packet.

In this embodiment, optical signals on the arbitration signal routes 110, 210, 310, and 410 in FIG. 12 use light of the wavelength $\lambda 1$, and optical signals on the connection routes 31, 32, 33, and 34 use the wavelengths $\lambda 2$ and $\lambda 3$ (which are different from each other). In this case, if $\lambda 1=\lambda 2$ or $\lambda 1=\lambda 3$, no problem is posed in terms of the arrangement.

How to execute the consistency maintenance operation of data in the cache memory upon changing of data in a cache enable area in the self node (e.g., when the node 100 is caching data (4 bytes) at address 01000000h on its own internal RAM which can be cached by other nodes, and is about to change the data) will be described below. In the following description, a difference from the first embodiment will be briefly explained.

Figure 17:
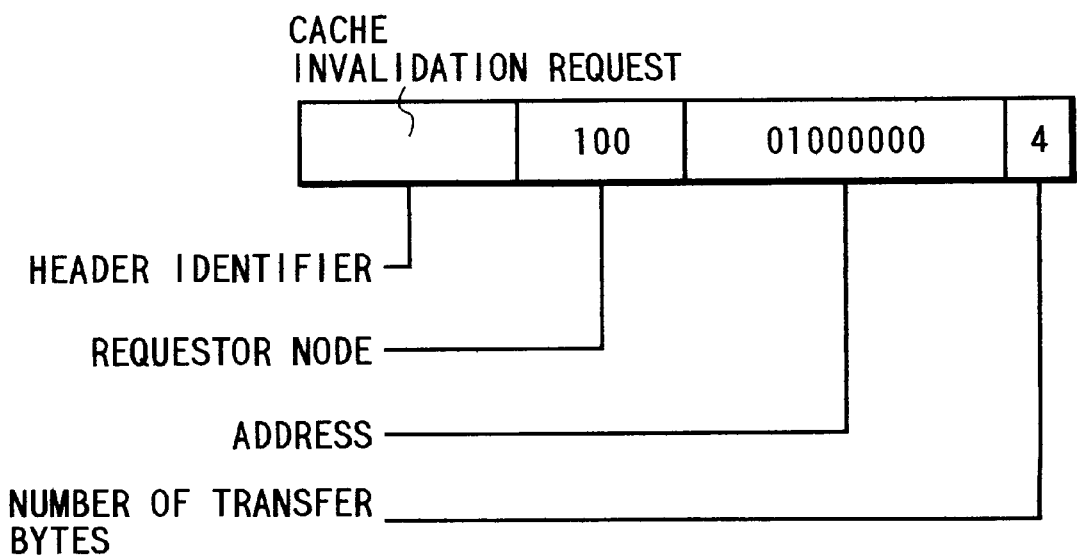
FIG. 17 shows the format of a cache maintenance request packet of the third embodiment.

In this embodiment, a cache maintenance request packet has the format shown in FIG. 17, and the cache information control device 24 instructs the nodes to invalidate the data at address 01000000h when they hold the data in their cache memories, on the basis of the input information, so as to maintain the consistency of data in the cache memories. For this purpose, the device 24 generates a cache memory invalidation packet shown in FIG. 14, and writes the packet in the parallel/serial converter 627. In this case, a node number which does not exist in practice is included in the connection end node field of the packet. The written packet is converted into an optical signal by the light emitting element 628, and the optical signal is sent to all the nodes via the star coupler 50.

Since the subsequent operation is the same as that in the above embodiment, a description thereof will be omitted.

In the embodiment described above, the arbitration signal routes 110 and 31, 210 and 32, 310 and 33, and 410 and 34 shown in FIG. 12 are assumed to be physically different signal routes. However, if these lines are logically separable, physically identical signal routes (i.e., identical optical fibers) may be used. In this case, in order to prevent crosstalk upon wavelength multiplexing, the wavelengths $\lambda 1, \lambda 2, \lambda 3$, and $\lambda c$ must be different from each other.

As described above, according to this embodiment, some or all the pieces of information required for data transfer in one node or between two nodes are sent from the node to the arbiter using the arbitration signal route, and some or all the pieces of information are re-distributed from the arbiter to the respective nodes on the basis of the information sent from the node via a data distributor, which is arranged on the connection route which can simultaneously connect a plurality of pairs of nodes, and distributes data to the nodes. Thus, a high-performance information processing system, which can improve the computing efficiency and the use efficiency of the connection routes in nodes since it can realize high-speed caching of information between nodes by executing the consistency maintenance operation of data in the cache memories while reflecting information distributed from the arbiter to the respective nodes in the nodes, can be realized.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. An information processing system comprising:

a plurality of nodes;

a connection route which can simultaneously connect a plurality of pairs of said plurality of nodes;

arbitration means for arbitrating use requests for use of said connection route; and arbitration signal routes for respectively connecting said arbitration means and said plurality of nodes, each of said plurality of nodes comprising:

at least one processor, a memory, a cache memory for storing a copy of data stored in said memory or in memories in others of said plurality of nodes, detection means for detecting a signal to indicate a rewrite of data and an address thereof from an internal bus in the node, updating means for updating an internal state of said cache memory on the basis of a detection result provided by said detection means, and transfer means for transferring, when data stored in said cache memory is rewritten and an original of the data is stored in another node, a use request of said connection route for transmitting the written data to that other node with an address of the original data, to said arbitration means via said arbitration signal route, wherein said arbitration means further comprises notification distribution means for distributing, when the request for use of said connection route for transmitting the written data to the node storing the original of the written data is transferred to said arbitration means with the address of the original data from one of said plurality of nodes, a notification representing the rewrite of data and the address thereof among all the rest of said plurality of nodes via said arbitration signal routes, and each of said plurality of nodes further comprises output means for outputting the signal to indicate the rewrite of data and the address thereof to the internal bus if the notification representing the rewrite of data and the address thereof is received from said notification distribution means.

2. A system according to claim 1, wherein said connection route can simultaneously connect the plurality of pairs of said plurality of nodes by multiplexing light beams of a plurality of wavelengths.

3. A system according to claim 1, wherein said connection route and said arbitration signal routes are constituted by a common optical fiber by multiplexing light wavelengths.

4. A system according to claim 1, wherein a protocol for maintaining consistency of data in said cache memory in the node is a write through invalidation protocol.

5. An information processing system comprising:

a plurality of nodes;

a connection route which can simultaneously connect a plurality of pairs of said plurality of nodes;

notification distribution means arranged on said connection route, for distributing a notification to said plurality of nodes;

arbitration means for arbitrating use requests for use of said connection route; and arbitration signal routes for respectively connecting said arbitration means and said plurality of nodes, each of said plurality of nodes comprising:

at least one processor, a memory, a cache memory for storing a copy of data stored in said memory or in memories in others of said plurality of nodes, detection means for detecting a signal to indicate a rewrite of data and an address thereof from an internal bus in the node, updating means for updating an internal state of said cache memory on the basis of a detection result provided by said detection means, and transfer means for transferring, when data stored in said cache memory is rewritten and an original of the data is stored in another node, a use request of said connection route for transmitting the written data to that other node with an address of the original data, to said arbitration means via said arbitration signal route, wherein said arbitration means transmits, when the request for use of said connection route for transmitting the written data to the node storing the original of the written data is transferred to said arbitration means with the address of the original data from one of said plurality of nodes by said transfer means, a notification representing the rewrite of data and the address thereof to said notification distribution means, and said notification distribution means distributes the notification representing the rewrite of data and the address thereof to said plurality of nodes via said connection route, and each of said plurality of nodes further comprises output means for outputting the signal to indicate the rewrite of data and the address thereof to the internal bus if the notification representing the rewrite of data and the address thereof is received from said notification distribution means.

6. A system according to claim 5, wherein said distribution means comprises a star coupler.

7. A system according to claim 5, wherein said connection route can simultaneously connect the plurality of pairs of said plurality of nodes by multiplexing light beams of a plurality of wavelengths.

8. A system according to claim 5, wherein said connection route and said arbitration signal routes are constituted by a common optical fiber by multiplexing light wavelengths.

9. A system according to claim 5, wherein a protocol for maintaining consistency of data in said cache memory in the node is a write through invalidation protocol.

10. A method of maintaining consistency of data in a cache memory in an information processing system which has a plurality of nodes each having at least one processor, a memory, and a cache memory for storing a copy of data stored in said memory or the memories in said plurality of nodes, comprising:

an arbitration step of arbitrating use requests of a connection route, which can simultaneously connect a plurality of pairs of the plurality of nodes, using an arbiter;

a transfer step of transferring, when data stored in the cache memory of a first node is rewritten and an original of the data is stored in a second node, a use request for use of the connection route for transmitting the written data from the first node to the second node with an address of the original data, from the first node to the arbiter using one of arbitration signal routes for respectively connecting the arbiter and the nodes;

a notification distribution step of distributing a notification representing the rewrite of data and the address thereof on the basis of the address of the original data transferred with the request for use of the connection route to the arbiter from first node in the transfer step from the arbiter among all the rest of the plurality of nodes using the arbitration signal routes; and an updating step of updating an internal state of the cache memory by receiving, the notification distributed among all the rest of the plurality of nodes in the notification distribution step, using a detection unit for detecting a signal output in response to a reception of the notification, to indicate a rewrite of data and an address thereof from an internal bus in the node.

11. A method according to claim 10, wherein the connection route can simultaneously connect the plurality of pairs of the plurality of nodes by multiplexing light beams of a plurality of wavelengths.

12. A method according to claim 10, wherein a common optical fiber is used as the connection route and the arbitration signal routes by multiplexing light wavelengths.

13. A method according to claim 10, wherein the node maintains consistency of data in the cache memory by a write through invalidation protocol.

14. A method of maintaining consistency of data in a cache memory in an information processing system which has a plurality of nodes each having at least one processor, a memory, and a cache memory for storing a copy of data stored in said memory or memories in said plurality of nodes, comprising:

an arbitration step of arbitrating use requests of a connection route, which can simultaneously connect a plurality of pairs of the plurality of nodes, using an arbiter via a notification distributor for distributing a notification to the respective nodes;

a transfer step of transferring, when data stored in the cache memory of a first node is rewritten and an original of the data is stored in a second node, a use request for use of the connection route for transmitting the written data from the first node to the second node with an address of the original data, from the first node to the arbiter using one of arbitration signal routes for respectively connecting the arbiter and the nodes;

a notification distribution step of distributing a notification representing the rewrite of data and the address thereof on the basis of the address of the original data transferred with the request for use of the connection route to the arbiter from the first node in the transfer step from the arbiter among all the respective nodes via the notification distributor using the connection routes; and an updating step of updating an internal state of the cache memory by receiving the notification distributed to the respective nodes in the notification distribution step using a detection unit for detecting a signal, output in response to a reception for the notification, to indicate a rewrite of data and an address thereof from an internal bus in the node.

15. A method according to claim 14, wherein the distributor distributes data using a star coupler.

16. A method according to claim 14, wherein the connection route can simultaneously connect the plurality of pairs of the plurality of nodes by multiplexing light beams of a plurality of wavelengths.

17. A method according to claim 14, wherein a common optical fiber is used as the connection route and the arbitration signal routes by multiplexing light wavelengths.

18. A method according to claim 14, wherein the node maintains consistency of data in the cache memory by a write through invalidation protocol.

* * * * *

UNITED STATES PATENT AND TRADEMARK OFFICE
CERTIFICATE OF CORRECTION

PATENT NO.    : 6,078,337
DATED         : June 20, 2000
INVENTOR(S)   : TOSHIYUKI FUKUI ET AL.

It is certified that error appears in the above-identified patent and that said Letters Patent is hereby corrected as shown below:

COLUMN 1:

Line 24, "5,602,663, now U.S. Pat. No." should be deleted.

Signed and Sealed this

First Day of May, 2001

Attest:

NICHOLAS P. GODICI

Attesting Officer      Acting Director of the United States Patent and Trademark Office